DE WITT C. LAMBSON.
BRAKING DEVICE FOR ELEVATING TRUCKS.
APPLICATION FILED SEPT. 26, 1917.

1,269,095.

Patented June 11, 1918.

WITNESS
W. C. Ross.

INVENTOR.
DeWitt C. Lambson.
BY Chapin + Neal.
ATTORNEYS.

UNITED STATES PATENT OFFICE.

DE WITT C. LAMBSON, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

BRAKING DEVICE FOR ELEVATING-TRUCKS.

1,269,095.

Specification of Letters Patent.

Patented June 11, 1918.

Application filed September 26, 1917. Serial No. 193,221.

*To all whom it may concern:*

Be it known that I, DE WITT C. LAMBSON, a citizen of the United States, and a resident of Springfield, in the county of Hampden and State of Massachusetts, have invented certain new and useful Improvements in Braking Devices for Elevating-Trucks, of which the following is a specification.

This invention relates to braking devices for trucks, and more particularly to such devices as are adapted for use with lifting or elevating trucks.

Lifting trucks have come into extensive use in factories as an efficient means of transferring loads from point to point. Frequently, in factories there are numerous inclined runways, down which the loaded trucks must pass, and heretofore, with trucks of the lifting type, it has been customary for the operator to hold back the load by brute strength. Aside from the effort necessary on the part of the operator to check the descent of the truck, there is always the possibility that a heavily loaded truck may get away from the operator, while passing down steep inclines, and cause an accident.

An object of this invention is to provide a braking mechanism designed for application to a truck of the lifting type and particularly characterized by an improved actuating device involving a manually-operable lever which may be moved to apply various degrees of braking pressure to the wheels and is arranged to "stay put" in its moved positions without the necessity of special holding means.

Another object of the invention is to provide a braking mechanism for a truck of the lifting type which may be operated only when the load lifting platform of the truck is in raised position ready for transportation of the load and which is arranged to permit the relatively large degree of movement between the platform and wheel supported frame of the truck when the former is lowered.

Another object of the invention is to provide a generally simplified and improved mechanism for actuating a brake in a lifting truck mechanism.

Other objects and advantages will appear in the following description and in the appended claims.

The invention, in an embodiment at present preferred, is shown for illustrative purposes in the accompanying drawings, in which—

Figure 1:
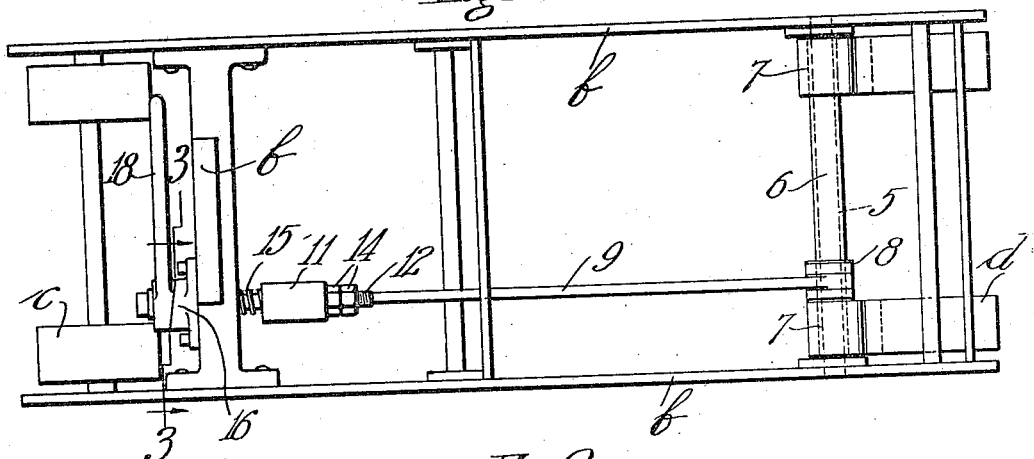
Figure 1 is a plan view of a truck embodying the invention.
Figure 2:
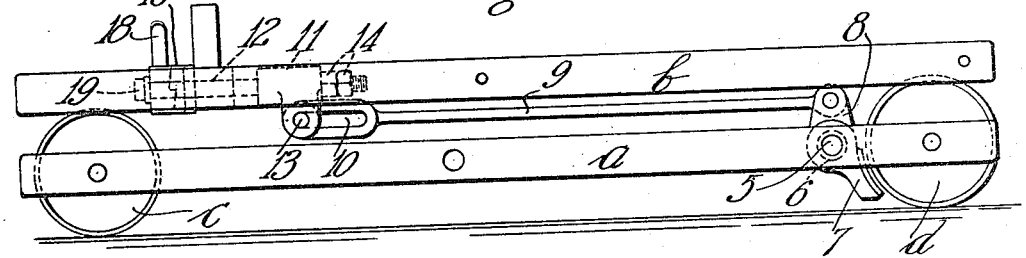
Fig. 2 is a side elevational view thereof.

Referring to these drawings, a lifting truck has been indicated in conventional form in Figs. 1 and 2. The relatively stationary and relatively movable frames of the truck are designated *a* and *b*, respectively. The frame *a* is supported by front and rear wheels *c* and *d*, respectively, and the frame *b* or load lifting platform is supported from frame *a* through the intermediary of suitable lifting mechanism (not shown). The lifting mechanism has not been illustrated for the reason that it is unnecessary to an understanding of the invention. Such mechanism is well known to those skilled in the art and for the present purposes it will suffice to state that frame *b*, which is illustrated in elevated position, may be lowered by moving it toward the right (Fig. 2) and may again be raised by moving it toward the left.

Figure 3:
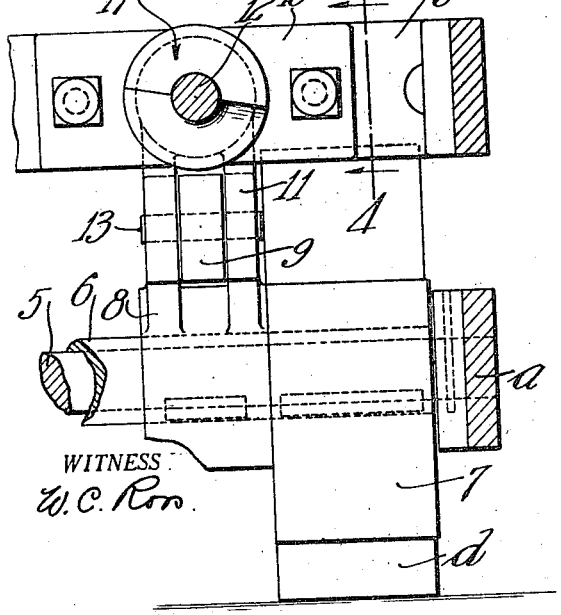
Fig. 3 is a fragmentary cross-sectional view taken on the line 3—3 of Fig. 1.
Figure 4:
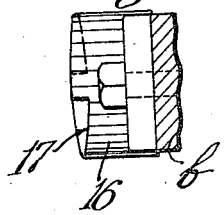
Fig. 4 is a sectional view taken on the line 4—4 of Fig. 3.

Mounted in and extending between the two longitudinal members of frame *a* is a cross-shaft 5 and loose on the latter and held from axial movement by the said longitudinal members is a sleeve 6. Adjacent each rear wheel *d* is a brake shoe 7, which is suitably fixed to sleeve 6 and depends therefrom to engage its wheel *d*. Also fixed to sleeve 6 and upstanding therefrom is an arm 8 which is pivotally connected to a link 9. The latter extends forwardly and at its forward end is provided with a slot 10. A member 11, loosely mounted on a rod 12, which in turn is slidably mounted in frame *b*, has a forked depending portion (see Figs. 2 and 3) which encompasses the forward end of link 9, and the latter is connected to member 11 by a pin 13 which is suitably fixed in member 11 and loosely passes through slot 10.

One end of rod 12 is threaded to receive nuts 14 against which the member 11 is forced by a coiled spring 15 (Fig. 1) which acts between the member and a transversely-extending forward part of frame b. Fixed to the latter part and on the side opposite from spring 15 is a member 16 having on its forward face two cam surfaces 17. The rod 12 passes loosely through member 16 and through a lever 18, the hub portion of which has similar cam surfaces to engage and coöperate with the surfaces 17. Rod 12 has a head 19 to engage the hub portion of lever 18 and thus the spring 15, which forces member 11 against nuts 14, acts through the latter and head 19 to hold the lever 18 in engagement with member 16.

In the operation of lifting trucks, the load lifting platform b is always in raised position when the load thereon is to be transported from point to point. This condition is necessary for, as is well known in the art, the load is supported on platforms having spaced legs between which the truck is positioned while its frame b is in lowered position. The elevation of frame b raises the platform sufficiently so that its spaced legs clear the floor. It will be readily apparent that, with frame b in raised position as illustrated in Fig. 2, the brakes may be readily applied. Thus, if lever 18 is pulled upwardly, it will also be forced forwardly by the coaction of its cam surfaces with the surfaces 17, and rod 12 and member 11 will, therefore, be carried therewith. The forward movement of member 11 causes a like movement of link 9 by reason of the engagement of pin 13 with the left hand end of slot 10, whereby lever 8 is rocked to force shoes 7 against wheels d.

The connection between lever 8 and member 11 is arranged to permit frame b to be lowered without causing a movement of the brake shoes. Thus, when frame b is lowered, it moves longitudinally to the right (Fig. 2) and pin 13 moves idly to the right hand end of slot 10 without imparting movement to link 9. On account of the fact that the loaded truck is not transported when frame b is in lowered position, it is not necessary to provide means for applying the brakes while frame b is in lowered position. The arrangement, whereby frame b can be lowered without disturbing the position of the shoes 7, is particularly important in elevating trucks for, as is well known, the frame a and platform b are purposely arranged to lie closely adjacent the floor, and, therefore, there is but little room available for the mounting of brakes. Were the slot 10 omitted, the shoes 7 would be swung in a clockwise direction, when the platform b is lowered, to such an extent that the lower ends of the shoes would dig into the floor. To shorten the shoes 7 sufficiently to avoid this difficulty would reduce to an undesirable extent the area of the shoes available for braking action on the wheels and then a longer lever 18 would be required, but this already is as long as is permitted by the standard construction of lifting trucks.

The special problems of mounting a brake system on trucks of the lifting type have been solved by the expedient of the pin and slot connection or its functional equivalent between the parts on frames a and b. The braking system has been particularly designed to suit lifting trucks as commonly constructed rather than to attempt modification of the lifting truck structure, which has been already developed into successful commercial and standardized form.

A most important feature of the structure described consists in the arrangement of the mechanism for actuating the brake shoes. This mechanism is of advantageously simple and relatively inexpensive construction, and yet is highly efficient for the present use. The cam surfaces 17 and the mating cam surfaces on lever 18 are so made that the latter "stays put" in any position to which it may be moved. Thus, the inclination of the cam surfaces is such that spring 15 is not operable to turn the cam surfaces on lever 18 relatively to the surfaces 17. This arrangement is important in the present apparatus inasmuch as it allows the operator, just before he starts the truck down an incline, to move lever 18 to obtain the desired degree of braking pressure on wheels d. The truck may then safely pass down the incline with little exertion on the part of the operator. It is particularly to be noted that the lever 18 remains in the position to which it is moved without the provision of special holding means and, aside from the saving incident to the elimination of such means, there is the decided advantage that the setting or releasing of the brakes is made easier and more convenient for the operator.

The invention has been disclosed, in an embodiment at present preferred, for the purposes of illustration, but the scope of the invention is defined by the appended claims rather than by the foregoing description.

What I claim is—

1. The combination in a truck, of brake shoes movably mounted to engage wheels thereof, and stationary and lever operated coacting cams so constructed that the lever operated cam is movable axially when turned with relation to the stationary cam, and connections between the lever and said shoes to force the latter against said wheels by the axial movement of the lever operated cam, said cams being so constructed that the lever operated cam remains in the positions to which it is moved.

2. In a lifting truck, a wheel supported frame, a load lifting platform movable relatively thereto, brake shoes pivotally mounted on the frame to swing into engagement with the rear wheels of the truck, a lever on the forward end of the platform, a pivotal support for said lever, connections between said support and shoes, and means operable to move the lever and support axially of the latter when the lever is swung on its pivotal support, the lever and said means being constructed and arranged so that the lever remains in positions to which it is moved, whereby the lever may be set to cause various degrees of braking pressure to be exerted on said wheels.

3. In a lifting truck, having a wheel supported frame and a load lifting platform movable relatively to the frame, brake shoes carried by the frame and adapted to engage wheels thereon, a power multiplying mechanism carried by the platform, and means connecting said shoes and mechanism, whereby an actuation of the latter will move the shoes against said wheeels, said mechanism comprising a cam on the platform, a rod passing through said cam and connected to the last-named means, a lever mounted on said rod and having a coöperating cam portion to engage said cam, and means to hold the said portion in engagement with the cam, whereby a swinging movement of said lever will move the rod and thus said shoes, said lever arranged to be frictionally held in the positions to which it is moved.

4. The combination in an elevating truck, having a wheel supported frame and a load lifting platform movable relatively to the frame, of braking means mounted on the frame and adapted to engage wheels thereon, actuating means carried by the platform, and means connecting the actuating and braking means, whereby an actuation of the former will cause the latter to exert a braking action on said wheels when the platform is in raised position, the connecting means being constructed to permit the platform to be lowered without moving the braking means.

5. In a lifting truck, having a wheel supported frame and a load lifting platform movable relatively to the frame, brake shoes carried by the frame and movable to engage wheels thereon, a power multiplying mechanism carried by the platform and adapted for manual actuation, said mechanism including a slidable member, and a link connecting the latter to said shoes, said link and member having a pin and slot connection to prevent movement of the brake shoes when the platform is lowered relatively to the frame.

DE WITT C. LAMBSON.

Copies of this patent may be obtained for five cents each, by addressing the "Commissioner of Patents, Washington, D. C."